United States Patent Office 3,334,061
Patented Aug. 1, 1967

3,334,061
PETROLEUM RESINS
William Thomas House and Lloyd Albert Pine, Baton Rouge, La., assignors to Esso Research and Engineering Company, a corporation of Delaware
No Drawing. Filed June 1, 1965, Ser. No. 460,467
6 Claims. (Cl. 260—33.6)

ABSTRACT OF THE DISCLOSURE

The color increase induced by the stripping of hydrocarbon resins is reduced by adding to the stripped resin, 0.1 to 10 weight percent of a conjugated diolefin of 4 to 5 carbon atoms, such as butadiene, isoprene or cyclopentadiene followed by standing for from three to seven days.

This invention relates to a novel process for improving the color of petroleum hydrocarbon resins, and more particularly relates to a process in which petroleum resins are improved in color by the addition of small amounts of a diolefin to a solution of the stripped resin.

Hydrocarbon resins can be produced from certain petroleum refinery streams containing olefins and diolefins by such methods as polymerization using Friedel-Crafts catalysts. Unfortunately, however, the product is so highly colored as to limit the market. A large part of this color is imparted during the stripping of the product to remove low boiling liquid fractions, etc.

It has now been found, however, that if a relatively small amount of a diolefinic compound including particularly a conjugated $C_4$ to $C_5$ alicyclic and branched chain aliphatic diolefin, specifically isoprene, butadiene or cyclopentadiene or mixtures thereof is added to a solution of the stripped resin in a low-boiling solvent, e.g. heptane and the mixture allowed to stand for several days at room temperature, the color is significantly reduced. In order to achieve these improved effects, it is necessary and critical that the diolefin be added to the resin after it has been stripped of low boiling polymers. If the diolefin is added before stripping, the high temperature necessary to strip off the liquid polymer causes further color degradation.

The resin which is obtained in accordance with the present invention is prepared from certain unsaturated petroleum refinery streams which contain various mixtures of acyclic and cyclic olefins and diolefins by contact with a Friedel-Crafts type catalyst under relatively low temperatures, e.g. $-100°$ to $+90°$ C. The hydrocarbon mixtures obtained by steam cracking petroleum oils have been found to be especially useful for this purpose. These distillates are prepared by cracking petroleum fractions such as kerosene, gas oil, naphtha or residua in the presence of large amounts of steam, e.g. 50 to 90 mole percent, at temperatures of approximately 540 to 900° C. This steam cracking process is well known in the patented art and literature. The cracked liquid fraction ordinarily contains small amounts of cyclopentadiene monomers which are usually at least partially removed by thermal treatment of the fraction to cause dimerization of the cyclodiene. The cyclodienes may be left in the fraction if it is desired. These resins are useful for the preparation of floor tiles, in paints, for varnish manufacture and the like. In general, various steam cracked hydrocarbon streams such as described above and more particularly below may be employed. For example, a resin may be prepared from feed stocks having a relatively wide boiling range, e.g. 10° to 230° C., preferably 20 to 220° C., from which essentially all of the $C_4$ hydrocarbons and lighter hydrocarbons have been removed, although one may also use one or more narrower fractions such as the 40° to 150° C. fraction, the 150° to 230° C. fraction, etc. It is also sometimes advantageous to remove the isoprene from the naphtha. Typical analyses of such a wide steam cracked boiling fraction are shown in the following table:

TABLE I.—STEAM CRACKED NAPHTHA FRACTION BOILING BETWEEN 10° AND 230° C.

| Component | Approximate Boiling Range, ° C. | Specific Example, vol. percent | General Range (15–70° C.), vol. percent |
|---|---|---|---|
| $C_5$ Fraction | 10–65 | 31 | 10–40 |
| $C_6$–$C_8$ Fraction | 65–150 | 64 | 30–70 |
| $C_9$–$C_{12}$ Fraction | 150–230 | 5 | 0–25 |

Although the actual content of various chemical classes of hydrocarbons present may vary somewhat according to the type of crude oil from which the gas-oil fraction is being cracked and according to the steam cracking conditions and fractionating conditions, nevertheless, in general, a desirable, essentially debutanized, steam-cracked naphtha fraction boiling between 10° and 230° C. will have approximately the following range in composition:

Percent by weight
Aromatic hydrocarbons _____ 10–50
Olefins _____ 30–70
Unreactive paraffins _____ 0–5

A typical sample of such a fraction will consist essentially of about 5 to 20 weight percent benzene, about 5 to 15 weight percent toluene, about 0 to 25 weight percent of $C_9$ to $C_{12}$ aromatic hydrocarbons, about 5 to 15 weight percent of cyclodienes, about 10 to 15 weight percent aliphatic diolefins, about 15 to 60 weight percent of mono-olefins and about 0 to 5 weight percent unreactive paraffins. The reaction product is quenched, washed and stripped to give the final resin product. For example, the reaction mixture may be washed with alkali or water, quenched with dilute sulfuric or phosphoric acid and stripped to remove low boiling polymer. The product is a resin which has an average color of 9–13 Gardner and a softening point of at least 100° C. A typical resin has the following properties:

Softening point (ring and ball), ° C. _____ 100±3
Specific gravity at 25/25° C. _____ .970–.975
Color (Gardner) _____ 13
Flash point (C.O.C.), ° F. _____ 500
Fire point, ° F. _____ 520
Iodine value (Wijs) _____ 120
Iodine value (corrected for substitution) _____ 30
Molecular weight _____ 1100

If desired the resin may be hydrogenated under a pressure of about 100 to 5000 p.s.i.g., preferably about 500 to 3000 p.s.i.g., at temperatures of 40 to 400° C., preferably about 150 to 260° C. It may be conducted in a continuous process under a hydrogen flow rate of about 100 to 2000 standard cubic feet per barrel of resin with a liquid feed rate of 0.1 to 5, preferably 0.3 to 2 v./v./hr., i.e. volumes of liquid feed per volume of catalyst per hour. Alternately, the hydrogenation may take place in a batch process, maintaining a $H_2$ pressure of 500 to 3000 p.s.i.g. and a resin/catalyst ratio of 1/1 to 300/1, preferably 10/1 to 50/1.

Suitable solvents for use in the hydrogenation step include n-hexane and its various isomers, n-heptane, and the like.

Suitable hydrogenation catalysts include metals of Groups VI and VIII of the Periodic Table, e.g. nickel, palladium, platinum, nickel sulfides, copper chromite, cobalt molybdate, etc. which may be supported on light porous or other granular particles such as alumina, pumice, clay, charcoal, etc. The hydrogenated resin is stripped in the same manner as the original resin. The resulting resin has a Gardner color, in 50% solution in toluene, of less than 2 and is soluble in petroleum hydrocarbon.

In accordance with the present invention either the original resin or the hydrogenated resin is dissolved, after stripping, in a light hydrocarbon solvent, such as heptane, hexane, or the like and to this solution is added from 0.1 to 10 wt. percent of a conjugated diolefin of 4 to 5 carbon atoms such as butadiene, isoprene or cyclopentadiene. The mixture is then allowed to stand for from three days to a week and the solvent and any residual diolefin may be removed by low temperature stripping. However, in many cases it may be desirable to leave the diolefin in the product since the product is generally marketed in solution and the diolefin acts as additional solvent. The product is a low colored resin having almost half of the color caused by the original relatively high temperature stripping removed.

Typical examples of the invention are set forth below, although it is not intended to limit the invention in any way to the particular experiments presented.

Example 1

The feed or raw material which was subjected to polymerization was made by steam-cracking a gas oil petroleum fraction derived from a paraffinic type crude, the cracking being carried out at a temperature of about 700 to 800° C. and pressure of 5 to 20 p.s.i.g. in the presence of about 70 to 80 mol percent of steam.

The approximate analysis of the resultant steam-cracked fraction, after debutanizing, was as follows:

| | Volume percent |
|---|---|
| $C_5$ cyclodiolefins | 5 |
| Aliphatic $C_5$ diolefins | 5 |
| $C_5$ olefins | 20–21 |
| $C_6$–$C_8$ diolefins | 8–10 |
| $C_6$–$C_8$ olefins | 14–15 |
| $C_9$–$C_{12}$ diolefins | 3 |
| $C_9$–$C_{12}$ olefins | 4 |
| Benzene | 15 |
| Toluene | 10 |
| Xylenes | 2–3 |
| $C_9$–$C_{12}$ aromatics | 5–6 |
| Paraffins | 3 |

The above steam-cracked fraction was subjected to heat soaking and distillation to remove pentenes, isoprene, and cyclodienes to produce a feedstock with this approximate analysis:

| | Volume percent |
|---|---|
| Pentenes | 4 |
| Isoprene | 2 |
| Piperylenes | 8 |
| Acetylenes | 1 |
| Cyclodienes | 2 |
| Benzene | 40 |
| Toluene | 10 |
| $C_6$–$C_8$ diolefins | 13 |
| $C_6$–$C_8$ olefins | 20 |

The product was then polymerized in a continuous flow unit at a temperature of 38 to 55° C. for a reactor residence time of about one half hour with about 1 weight percent $AlCl_3$ catalyst based on feed. From the reactor the resin stream was passed into a "drowning drum" where the catalyst was decomposed with water and steam at approximately 95° C. The aqueous phase was allowed to separate and the resin stream was then subjected to several washing cycles at elevated temperature and pressure to further remove inorganic residues. From a settler the stream was fed into a furnace and flash tower to remove unreacted feed components. The final product emerging from the stripping operation possessed a 30–40° C. softening point and contained 90–92% solid resin.

This resin was stripped of polymeric oils by heating to a maximum bottoms temperature of 200–215° C. at 5–10 mm. Hg for at least one hour. Analyses for the resultant resin were: softening point 110° C., molecular weight (osmometer) 1480, and Gardner color 9.

Example 2

A portion of the 30–40° C. softening point resin of Example 1 was dissolved in heptane and contacted with hydrogen in the presence of a 5% palladium or alumina catalyst under 1000 p.s.i.g. After thirty minutes a hydrogenated product was obtained which was substantially water white. This resin was stripped dry in the manner described in Example 1.

Example 3

Samples of the original dry resin of Example 1 and the hydrogenated resin of Example 2 were dissolved in n-heptane to the same concentration as before stripping. To these solutions was added 5 wt. percent, based on resin, of isoprene and the mixtures allowed to stand for five days at room temperature. Electrophotometer readings were taken before and after stripping and at the end of the five days treatment with isoprene. The following results were obtained.

| Type of Resin | Solution Colors [1] | | | Percent Color Removal |
|---|---|---|---|---|
| | Before Stripping | After Stripping | After Isoprene Treat | |
| Original | 41.9 | 65.0 | 51.8 | 20.3 |
| Do | | 51.5 | 35.9 | 30.3 |
| Hydrogenated | 9.6 | 31.8 | 16.6 | 47.8 |
| Do | 9.7 | 19.8 | 11.8 | 40.4 |
| Do | 9.8 | 15.6 | 11.2 | 28.1 |
| Do | 10.6 | 20.6 | 13.5 | 34.4 |

[1] By electrophotometer reading.

The above data show that a post-stripping treatment of resins either hydrogenated or not markedly reduces the color of the final product.

Example 4

A sample of hydrogenated resin prepared as in Example 2 and having a solution color of 3.4 by electrophotometer reading was stripped as in Example 1 to give a 21% yield of dry resin. This dry resin was dissolved in pentane to the same 21.0% concentration as before stripping and 5 wt. percent isoprene, based on resin, was added to the solution. Electrophotometer reading of the solution color was 6.5. Five days later the color reading had fallen to 5.1 indicating 21.5% color removal. The pentane and any residual isoprene was removed by vacuum stripping at room temperature to give solid resin. This solid resin was redissolved in pentane to give a 21.0% solution with a color reading of 5.5 showing that the color of the treated resin was not appreciably degraded by mild stripping conditions.

Example 5

The experiment of Example 4 was repeated. In this case the solution color dropped from 7.0 to 5.9 during the five day isoprene treat. The solid resin was recovered by vacuum stripping and redissolved to give a solution with a color reading of 6.2.

The nature of the present invention having been fully set forth and specific examples of the same given, what is claimed as new and useful and desired to be secured by Letters Patent is:

1. In a process for preparing a petroleum resin from a steam-cracked naphtha fraction boiling between about 10 and 230° C. having the following composition:

| | Parts by weight |
|---|---|
| Benzene | 5–20 |
| Toluene | 5–15 |
| $C_9$–$C_{12}$ aromatic hydrocarbons | 0–25 |
| Cyclic diolefins | 5–15 |
| Aliphatic diolefins | 10–15 |
| Aliphatic monoolefins | 15–60 |
| Paraffins | 0–5 | in which said fraction is polymerized in the presence of a Friedel-Crafts catalyst at a temperature between −100 and +90° C., to polymerize the resin-forming constituents, the resin is separated from the non-resin forming constituents and catalyst and dissolved in a low-boiling hydrocarbon, the method of reducing the color of the resin which comprises adding 0.1 to 10 wt. percent, based on resin, of a $C_4$ to $C_5$ conjugated diolefin, and allowing said mixture to stand from three days to a week.

2. The process of claim 1 in which the conjugated diolefin is isoprene.

3. A low colored composition of matter comprising a solution of a stripped petroleum resin in a hydrocarbon solvent containing 0.1 to 10 wt. percent, based on resin, of a conjugated diolefin of 4 to 5 carbon atoms.

4. The composition of claim 3 in which the diolefin is isoprene.

5. A low colored composition of matter comprising a solution of a stripped hydrogenated petroleum resin in a hydrocarbon solvent containing 0.1 to 10 wt. percent, based on resin, of a conjugated diolefin of 4 to 5 carbon atoms.

6. The composition of claim 5 in which the diolefin is isoprene.

References Cited

UNITED STATES PATENTS 2,750,353   6/1956   Mirviss et al. _____ 260—45.5

MORRIS LIEBMAN, *Primary Examiner.*

S. L. FOX, *Assistant Examiner.*